2,848,893

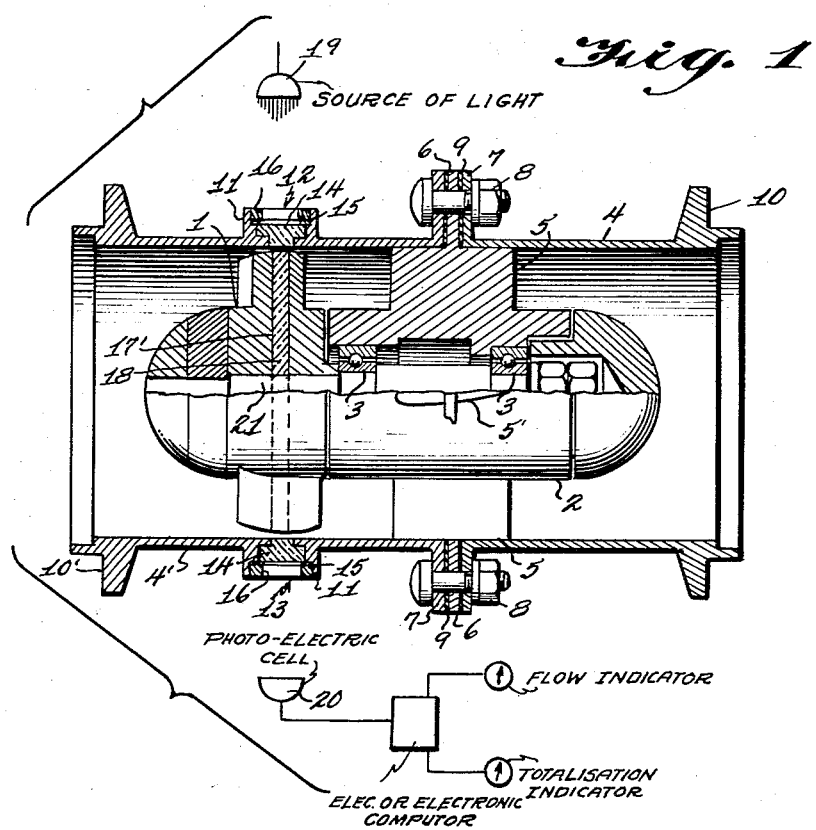
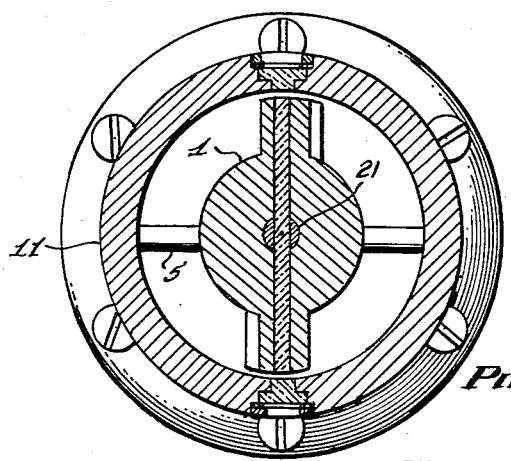

TRANSPARENT TURBINE ELEMENT FOR ELECTRONIC FLOW METERS

Pierre Edmond Tuffet, Tarbes, and Jean Soulie, L'Union, France

Application December 7, 1955, Serial No. 551,575

Claims priority, application France August 11, 1955

6 Claims. (Cl. 73—231)

The present invention has reference to turbines adaptable to flow meters or counters and more particularly to flow meters of the electric or electronic type mounted on fluid pipings.

An object of the invention is to provide a turbine as aforesaid having a very small weight representing a few ounces and a very reduced size while being nevertheless most accurate, thereby enabling this turbine to be fitted upon appliances or plants of small volume.

Another object of the invention is to provide a turbine as aforesaid capable of being interposed in tubes or pipings through which flows a gaseous or hydraulic fluid the rate of flow of which has to be measured and operating in conjunction with a flow meter which may be of the electric or electronic type.

A further object of the invention is to provide a turbine as aforesaid operating by the novel way of intercepting a light ray or beam of rays and having a very small inertia, whereby this turbine can reach an extreme degree of accuracy for recording the rates of flow of the fluid passing through the piping with which it is associated.

A still further object of the invention is to provide a turbine as aforesaid made up of a minimum number of simple, light and sturdy parts and capable of being manufactured at cheap cost.

With these and such other objects in view as will incidentally appear hereafter, the invention comprises the novel construction and combination of parts that will be now described with reference to the accompanying diagrammatic drawing exemplifying the same and forming a part of the present disclosure.

In the drawing:

Figure 1 is a diametrical sectional view of the improved turbine as it may be interposed between two aligned sections of a tube or piping through which a gaseous or hydraulic fluid flows, the rate of flow of this fluid having to be measured, and Figure 2 is a transverse section on line 2—2 of Figure 1, partly in elevation.

As illustrated, 1 designates the turbine proper which is mounted along the longitudinal axis of a piping made up of a pair of spaced sections indicated generally by 4 and 4'. For the sake of simplicity, the turbine is assumed to have only two vanes and its rotor is mounted (as shown) through the medium of roller bearings 3 upon a stationary body portion 2. The body portion 2 of the turbine 1 is centralized with respect to the piping section 4 by means of an intermediate member 5 having the shape of a four limb star, each limb of this star-shaped member having the outline as shown at 5'. At the end of each star limb and at right angles to its plane of symmetry is arranged a securing ring 6. The two sections 4, 4' of the piping are axially aligned and have edge flanges 7 between which are interposed a securing ring 6. The assembly is held in position by screws and nuts 8, gaskets such as 9 ensuring adequate tightness.

The opposite ends of the two sections 4, 4' of the piping are provided with shoulders such as 10 the purpose of which is to ensure proper interposition of said sections at the suitable location of the piping through which there is a flow of fluid the rate of which has to be measured.

The piping section 4' has mounted thereon a ring member 11 formed with a pair of diametrically opposed ports 12, 13. Stoppers such as 14 seal said ports so as to prevent any leakage of the fluid which flows through the piping. Such stoppers are provided with gaskets 15 held in position by annular nuts 16.

In the present constructional form, the stoppers 14 are of cylindrical shape and made of a transparent material, their location being such that their internal face is flush with the inner wall of the piping section 4'.

The transverse axis 17 of the rotor of the turbine 1 (extending at right angles to the major axis of the piping) has in alignment with the ports 12, 13 a bore 17' in which is accommodated a cylindrical core 18 made of a transparent material.

The transparent cylindrical core 18 extends from one of the transparent stoppers 14 through the stepped rotor shaft 21 to the other one.

It will be understood that, owing to this arrangement, if on the one hand the filament of an energizing lamp 19 is placed along the axis of the port 12 and the transparent core 18 housed in the bore 17' and if on the other hand a photo-electric cell 20 is placed along the axis of the port 13 and said transparent core 18, as the fluid which flows through the piping revolves the rotor of the turbine 1, the latter allows a luminous impulse to pass therethrough every time it effects half a revolution upon itself. Such impulses may be electrically or electronically computed or recorded, thereby indicating the figure representing the instantaneous rate of flow of the fluid as well as the volume of fluid that has flowed through the piping during a given period.

An arrangement such as the one shown in the drawing permits rates of flow ranging from 300 to 20,000 cubic decimeters per hour to be readily measured. Its weight is very small.

Minor constructional details of this turbine adaptable to a flow meter may be varied without departing from the spirit of the invention. Thus for example the turbine may have its stationary part mounted through the medium of needle bearings, ground hard stones between points or stocks, etc. The transparent material used for making the stoppers and the core may be glass, quartz, crystal, etc.

A second photo-electric cell might be provided if computation by each quarter of a revolution were sought instead of a computation by each half revolution.

What is claimed is:

1. In a turbine for an electric flow meter of the type comprising means for so mounting the same in a piping for the fluid whose rate of flow must be measured as to cause said fluid to impart rotation to said turbine about an axis coincident with the piping axis, a transparent transverse member extending completely through said turbine, a stationary ray source for emitting a beam of rays through the piping axis, and stationary ray-responsive means arranged for being energized every time said transparent member is interposed between said ray source and said responsive means determining the number of revolutions effected by the turbine.

2. In a turbine for driving an electric flow meter of the type comprising means for so mounting the same in a piping for the fluid whose rate of flow must be measured as to cause said fluid to impart rotation to said turbine about an axis coincident with the piping axis, a core of transparent material extending completely through said turbine along the transverse axis thereof, a stationary ray source for emitting a beam of rays directed transversely of the piping axis, and stationary means responsive to the incoming rays and adapted to be energized every time said core is interposed between said source and said ray responsive means for determining the number of revolutions performed by the turbine.

3. A turbine according to claim 2, comprising a pair of diametrically opposed vanes, said transverse bore extending through said vanes from a free end of a vane to the free end of the opposite vane so that the transparent core extends over the full transverse thicknss of the turbine.

4. In a turbine for an electric flow meter of the type comprising means for so mounting the same in a piping for the fluid whose rate of flow must be measured as to cause said fluid to impart rotation to said turbine about an axis coincident with the piping axis, a transparent transverse member extending completely through said turbine, a piping section surrounding the turbine and provided with diametrically opposed ports, transparent stoppers sealing said ports, a stationary ray source for emitting a beam of rays positioned in front of one of said ports outside the piping, and stationary ray responsive means arranged outside the piping in front of the other port, said ray responsive means being energized every time said transparent member coincides with both ports so as to determine the number of revolutions performed by the turbine.

5. A turbine according to claim 4, wherein said turbine is provided with a transverse bore and a core made of a transparent material housed in said bore and forming the transparent transverse part of the turbine.

6. In a turbine for an electric flow meter of the type comprising means for so mounting the same in a piping for the fluid whose rate of flow must be measured as to cause said fluid to impart rotation to said turbine about an axis coincident with the piping axis, a pair of diametrically opposed vanes, said turbine having a bore extending along the transverse axis thereof and from the free end of one of said vanes to the free end of the oppositely located vane, a core made of a transparent material housed in said bore, a piping section encompassing the turbine, and provided with diametrically opposed ports, transparent stoppers sealing said ports, an energizing lamp having a filament registering with one of said ports outside the piping, a photoelectric cell mounted outside the piping in front of the other port, and a meter for recording the number of light impulses received by the photoelectric cell while the turbine rotates every time said transparent core coincides with said ports.

References Cited in the file of this patent

UNITED STATES PATENTS

| | | |
|---|---|---|
| 1,957,681 | Thompson | May 8, 1934 |
| 2,326,169 | Piquerez | Aug. 10, 1943 |